July 6, 1965  F. A. BERBERICK  3,192,813
ARTICLE POSITIONING APPARATUS
Filed May 7, 1962  4 Sheets-Sheet 1

INVENTOR.
F. A. BERBERICK
BY H. J. Winegar
ATTORNEY

July 6, 1965  F. A. BERBERICK  3,192,813
ARTICLE POSITIONING APPARATUS
Filed May 7, 1962  4 Sheets-Sheet 3

POSITIONING CYCLE

| | WIRE IMAGE ON PHOTO CATHODES | $E_{er}$ | $E_i$ | AMPLIFIER PHASE $E_{er}+E_i$ | | MOTOR DRIVING DIRECTION |
|---|---|---|---|---|---|---|
| A | 14 — 37 | — | — | — | NORMAL | 0 |
| B | 14 / 37 | — | ∼ | ∼ | REVERSED | → |
| C | 14 / 37 | ∼ | ∼ | ∼ | REVERSED | → |
| D | 37 | — | ∼ | ∼ | REVERSED | → |
| E | 14 37 | ∼ | ∼ | — | REVERSED | 0 |
| F | 14 37 | ∼ | — | ∼ | NORMAL | → |
| G | 14 / 37 | — | — | — | NORMAL | 0 |

INVENTOR.
F. A. BERBERICK
BY H. J. Winegar
ATTORNEY

INVENTOR.
F. A. BERBERICK
BY H. J. Winegar
ATTORNEY

United States Patent Office 3,192,813
Patented July 6, 1965

3,192,813
ARTICLE POSITIONING APPARATUS
Frank A. Berberick, Trenton, N.J., assignor to Western Electric Company, Incorporated, New York, N.Y., a corporation of New York
Filed May 7, 1962, Ser. No. 192,831
13 Claims. (Cl. 83—365)

This invention relates to an article positioning apparatus and in particular to apparatus for positioning an article having a measurable characteristic which varies periodically along a dimension thereof.

Many manufacturing operations require that articles be sequentially and accurately positioned with respect to a reference axis. When the article is small, the positioning is often accomplished by an operator viewing the article through a microscope and manipulating some manual positioning mechanism until the article is properly positioned for a manufacturing operation.

For many types of articles, feedback control systems have been developed to automate the positioning operation. Such systems typically utilize an electro-optical comparison device which views separate portions of the article and drives positioning motors until a null condition is reached. However, many articles are optically symmetrical about more than one point along a dimension. This is particularly true in cases where a series of similar articles must be rapidly and sequentially positioned. The aforementioned feedback systems are usually incapable of distinguishing between a desired symmetrical point and an undesired symmetrical point.

Accordingly, it is an object of this invention to provide a new and improved article positioning apparatus.

Another object of this invention is to provide new and improved apparatus for positioning an article having a measurable characteristic which varies periodically along a dimension.

A further object of this invention is to provide an article positioning apparatus capable of sequentially positioning corresponding portions of elements of a chain-like series in a predetermined position.

An apparatus for positioning an article which has a measurable characteristic varying periodically along a dimension illustrative of certain features of the invention may include a comparison means, a signal superimposing means, an article translating means and means for deactivating the superimposing means. In such an apparatus the comparison means produces a signal proportional to a comparison of the characteristic for portions of the article on opposite sides of the desired position, which signal in turn drives the translating means. At the beginning of the positioning step of a particular article, the superimposing means supplies a signal of predetermined magnitude to the translating means. The means for deactivating the superimposing means removes the predetermined signal from the translating means when a comparison of the comparison signal and the predetermined signal is a particular value, which removal will take place before the article reaches the desired position.

A more complete understanding of the invention may be obtained from the following detailed description of a specific embodiment thereof when read in conjunction with the drawings, in which.

Figure 1:
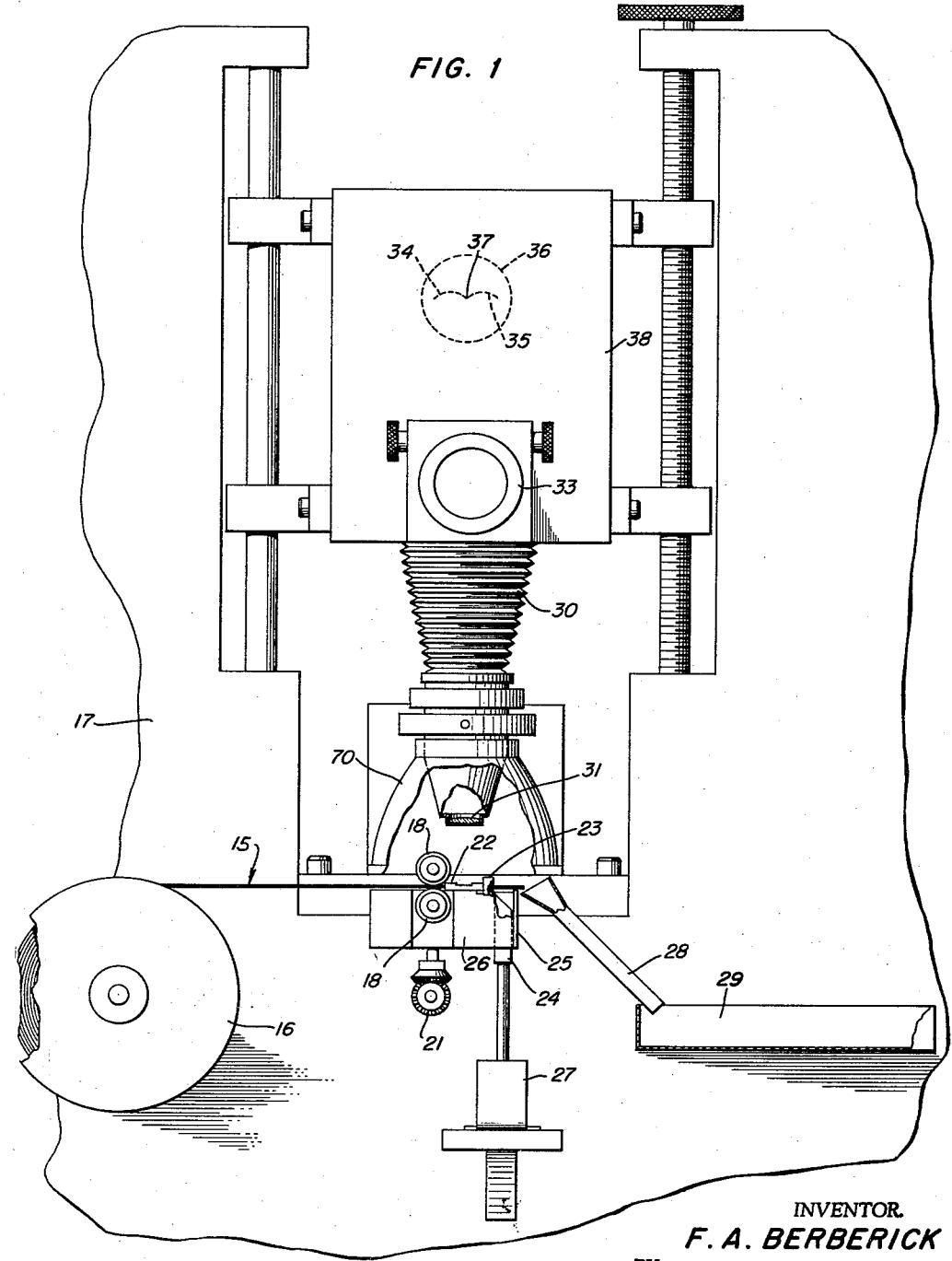
FIG. 1 is a front view of an article positioning apparatus forming a specific embodiment of the invention.
Figure 2:
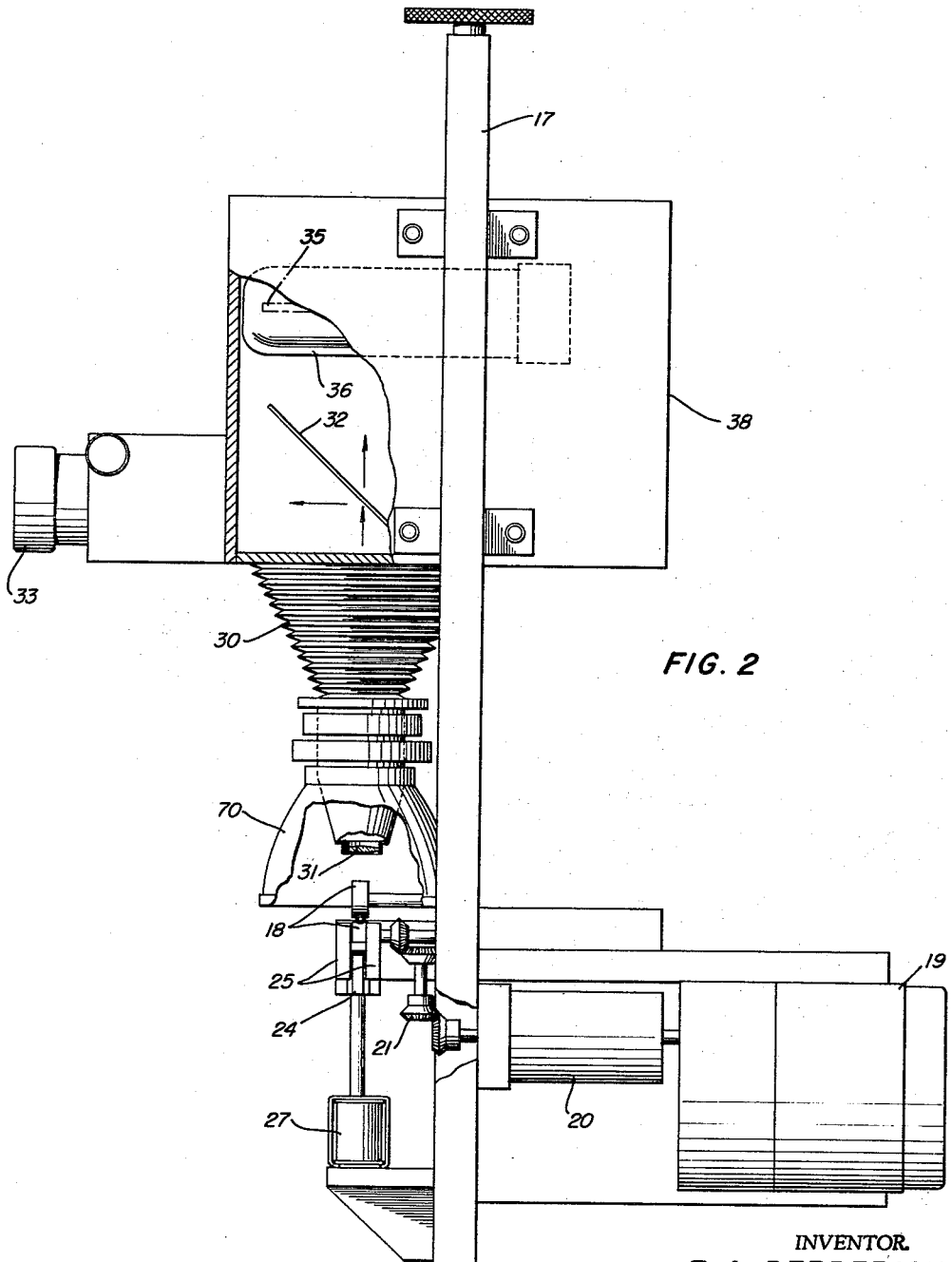
FIG. 2 is a side view of the apparatus shown in FIG. 1.
Figures 3, 4:
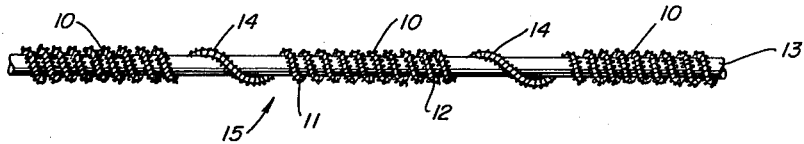
Figure 5:
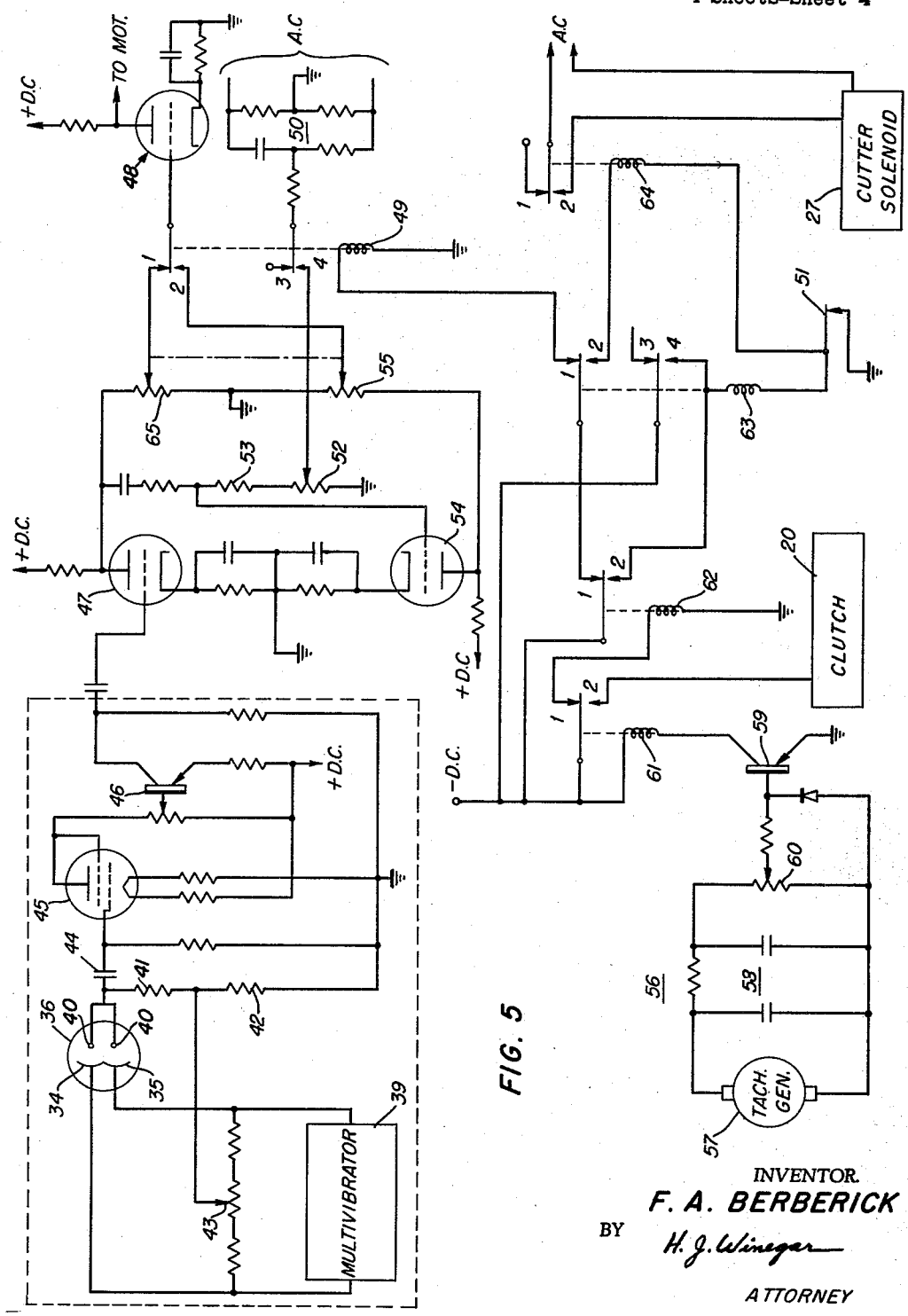

FIGS. 3A to 3G, inclusive, indicate the condition of various portions of the positioning apparatus for several different positions of the article;

FIG. 4 is an enlarged view of an article positionable by the apparatus of FIGS. 1 and 2; and FIG. 5 is a circuit diagram of an electrical circuit for the apparatus shown in FIGS. 1 and 2.

Referring now in detail to the drawings, wherein like numerals and letters designate the same elements throughout the several views, there is shown in FIG. 4 a side view of an article to be positioned, generally designated 15, comprising a series of interconnected tungsten filaments 10 which constitute the elements to be sequentially positioned. Filaments 10 are made of tungsten wire 11 having a diameter of .0006 in. The wire 11 is wound in a tight continuous helix on a molybedenum mandrel 12 of .0015 in. diameter and the mandrel 12 is then skip-wound on a second molybdenum mandrel 13 of .0045 in. diameter. Skip-winding consists of closely winding a preset number of turns and then taking a long or widely spaced turn 14 before resuming the close winding of turns. There are several thousand filaments 10 on a single roll and the filaments must be cut in the center of the skip-winding 14 to form single filaments. After the cutting operation the mandrels 12 and 13 are dissolved to leave only the individual tungsten filaments 10. The tungsten wire 11 contrasts optically with the mandrel 13.

Because variations in the length of the filaments 10 from a standard length could be cumulative throughout a roll containing thousands of filaments, it is impractical to mechanically advance article 15 the standard distance for each cutting operation. Thus the center of the skip-winding 14 must be located by an operator viewing the article 15 through a microscope, or the automatic positioning apparatus of this invention may be utilized.

Referring now to FIGS. 1 and 2 there is shown a spool 16 of filament wire 11 formed into article 15. The spool 16 is rotatably attached to a mounting plate 17. The wire 11 is passed between a pair of rubber rollers 18 which are driven by a two-phase servo motor 19 through a clutch 20 and gear train 21. As the wire leaves the rollers 18, it is fed into a slotted needle 22. The needle 22 may advantageously be a No. 20 hypodermic needle with an inner diameter of .023 in. The wire 11 is fed from the needle 22 through a hardened steel die block 23 over a cutter blade 24. The cutter 24 is slidably mounted within a track defined by protrusions 25 on a worktable 26. The worktable 26 is covered by a protective hood 70. The cutter 24 is activated to cut the wire 11 by solenoid 27 which is spring loaded to return the cutter 24 to its normal position upon completion of the cutting stroke. A tube 28 is provided near the cutter to guide the severed filaments 10 into a gathering box 29. The tube 28 is positioned such that about half of the length of a filament 10 is within the tube when the cutting stroke occurs. Thus the upward motion of the cutter 24 during the cutting stroke aids in pushing the severed filaments 10 into the tube 28.

A microscope 30 containing its own light source (not shown) and an objective lens 31, which is positioned directly above the slot in the needle 22, is mounted on plate 17. The image of the wire 11 as it passes through the slotted section of the needle 22 is projected by the objective lens 31 to a beam splitter 32. Half of the light from the beam splitter 32 is projected onto a viewing screen 33 and the remainder of the light falls on the cathodes 34 and 35 of a phototube 36. The phototube 36 and the beam splitter 32 are mounted within a box-like enclosure 38 which prevents interference with the functioning of the apparatus by ambient light.

It will be apparent from the description above of the wire and mandrel combination, particularly when it is recalled that the wire 11 and mandrel 13 contrast in brightness, that the article 15 possesses a measurable characteristic which varies periodically along its length, i.e., brightness because of the presence of skip-winding 14. It is the purpose of the positioning apparatus to sequentially center the skip-windings 14 of the filaments 10 about the optical axis 37 defined by the intersection of cathodes 34 and 35. The distance between the optical axis 37 and the cutting plane defined by cutter 24 in die 23 is equal to the length of one average filament 10. Thus the skip-winding being cut is the first such winding ahead of the skip-winding centered about the optical axis 37. For the embodiment of the invention here described, there is little deviation in the lengths of individual filaments 10 and the slight error introduced into the system by cutting at a skip in advance of the one positioned does not warrant the complication of placing the cutter 24 on the optical axis 37. It will be apparent, however, that it is fully within the scope of the invention to perform a manufacturing step at the optical axis 37.

The operation of the positioning apparatus can best be understood with reference to the electrical circuit drawing, FIG. 5. The phototube 36 may advantageously be an RCA 5584 gas type phototube. The cathodes 34 and 35 of the phototube 36 are biased from opposite ends of a multivibrator 39, typically 60 cycle, and the anodes 40 are interconnected. The output of the phototube 36 is applied across resistor 41. Added to this output is the voltage across resistor 42 which is a portion of the multivibrator 39 output derived through voltage divider 43 to compensate for sensitivity difference between the cathodes 34 and 35 of phototube 36.

Under the influence of the bias voltage developed by the multivibrator 39 only one of the cathodes 34 and 35 can conduct at a time. Since the current produced by the phototube 36 is a function of the amount of incident light, the instantaneous voltage developed across the load resistor 41 is thus determined by the amount of illumination on one of the cathodes 34 or 35. If both the cathodes 34 and 35 are equally illuminated and the sensitivity difference is properly compensated by the voltage divider 43, the voltage developed across the load resistor 41 will have a steady D.C. value. If one cathode receives more light than the other it will emit more electrons and develop a greater load voltage. The result will be a load voltage which has a 60 cycle square wave component superimposed on the D.C. level. The phase of the voltage will depend upon which of cathodes 34 and 35 is more highly illuminated.

A square wave component of this output, which thus represents a comparison of the light falling on one cathode with that on the other cathode, is coupled through capacitor 44 to an amplifying tube 45 and then to an amplifying transistor 46. The output of transistor 46 is once again amplified in vacuum tube 47. A band-pass filter is advantageously inserted between the transistor 46 and amplifying tube 47 to extract the fundamental component of the square wave. This component should be 90° out of phase with the line voltage to minimize undesirable hum pickup.

The output of amplifier 47, for convenience designated the error signal $E_{er}$, is fed to a final amplifying stage 48 through resistor 65 and contact 1 of a relay 49. The output of the final amplifier stage 48 is applied to the control winding of the two-phase servo motor 19. In the presence of a signal, the motor 19 will turn the rollers 18 and drive the wire 11 through the needle. When the skip-winding 14 is centered about the optical axis 37 the error signal $E_{er}$ will be zero, and in the absence of any other signal in the motor control winding, the motor 19 will be stopped. This condition is indicated in FIGS. 3A and 3G.

Another zero error signal condition will occur when the entire skip-winding 14 lies outside the field of microscope 30 and both of cathodes 34 and 35 are viewing only the main portion of a tungsten filament 10, as indicated in FIG. 3D. It will be apparent that a comparison of the light reflected from the optical field on opposite sides of the optical axis 37 will be zero. If the motor was driven by the error signal $E_{er}$ alone, the false null in the error signal would stop the motor 19. The article would thus be positioned at an undesired point of symmetry.

To overcome this false null a prepositioning step is necessary to bring the skip-winding 14 within the optical field of microscope 30 and phototube 36. It is an advantage of this invention that this same prepositioning operation may also be used to initiate movement of the wire 11 once a cut has been made, i.e., to move the wire 11 out of the position shown in FIG. 3A, and thus provide sequential operation of the apparatus.

The prepositioning operation is accomplished by adding a small additional voltage $E_i$ to the error signal $E_{er}$. The injected voltage $E_i$ is derived from a phase shifting circuit 50 which changes the phase of the A.C. supply voltage by 90°. Its addition to the error signal $E_{er}$ is controlled by relay 49.

As was mentioned above, FIG. 3A shows the wire 11 in a correct null position. However, after the cut has been made, the return stroke of the cutter 24 operates a microswitch 51 which, through a relay system to be described below, energizes relay 49. When relay 49 is energized a voltage is developed across a resistor 52, which constitutes the injected signal $E_i$. Resistor 52, together with a resistor 53, constitute a summing circuit for adding the injected signal $E_i$ to the error signal $E_{er}$. This combined signal is supplied to the grid of a vacuum tube 54, which reverses the polarity of the summed signals for reasons which will appear below. The output signal of tube 54 is applied to tube 48 and hence to the motor 19 through a resistor 55 and contact 2 of relay 49.

FIG. 3, in addition to showing the images on the cathodes 34 and 35 for several wire positions, indicates in tabular form the error signal, injected signal, their sum, the phase of the signal to amplifier tube 48, and the condition of the motor 19 for each of the several conditions.

In FIG. 3B, after the cut has been made, showing the conditions above, the skip-winding 14 is properly centered, the error signal $E_{er}$ is zero, the amplifier phase reversed, and the motor is moving solely under the influence of the injected signal $E_i$.

In FIG. 3C the skip-winding 14 has been moved and an error signal $E_{er}$ has been developed, which causes the motor 19 to continue driving the winding 14 in the same direction but at a greater speed.

In FIG. 3D the error signal disappears since both phototube cathodes are viewing the main portion of the filament 10 and none of the skip-winding 14 appears within the optical field of the microscope 30. The injected signal $E_i$, however, causes the motor 19 to continue rotating in the proper direction.

In FIG. 3E the skip-winding 14 has entered the field of the microscope 30 and is projected upon the left cathode 34. This causes an error signal of opposite phase to that of the injected signal to be developed. The sum of the signals and thus the output of tube 48 quickly reach zero. When the motor 19 stops relay 49 is caused to release and the injected signal $E_i$ is removed. Tube 48 is then fed with the error signal $E_{er}$ in its normal phase from tube 47 through contact 1 of relay 49. Thus, the motor will continue driving the filament 10 in the same direction and toward the desired null indicated in FIG. 3G, where a cut can again be made by cutter 24.

The operation of relay 49 and the other sequential functions of the apparatus are controlled by a null detection circuit generally designated 56. The null detection circuit 56 utilizes a tachometer generator 57 which produces an output voltage representative of the direction and magnitude of the rotation of motor 19. The generator 57 may be integrally constructed within motor 19 or it may be coupled to an extension of the shaft of the motor 19. The output of the tachometer generator 57 is filtered in filter circuit 58 and then used to bias the base of a transistor 59 through an adjustable potentiometer 60.

When the motor 19 is driving the wire 11 in the proper direction the voltage developed by the tachometer generator 57 is of such polarity that the transistor 59 is conductive and a relay 61 is energized. The clutch 20 may advantageously be energized through contact 2 of relay 61. When the speed of motor 19 decreases to a sufficiently small value, preferably zero, the bias voltage on transistor 59 decreases and relay 61 is de-energized; de-energizing the clutch 20 and the wire 11 is stopped.

A stepping relay 62 is energized through contact 1 of relay 61 when relay 61 is de-energized, i.e., when the motor is stopped. The stepping relay 62 is so constructed that it must be both de-energized and energized before it will transfer. A Struthers-Dunn type 211xBxP relay is suitable.

The operation of the relay circuit is best understood from a sequential description of its operation. Just after a cut has been made, when the wire 11 is in the position shown in FIG. 3B, but before the motor 19 is started moving again, the relays will all be in their conditions as shown in FIG. 5. Thus, relay 61 is de-energized, stepping relay 62 is energized through contact 1 of relay 61, and contact 1 of stepping relay 62 is closed. A relay 63 is de-energized and relay 49 is energized through a path consisting of contact 1 of relay 63 and contact 1 of stepping relay 62.

As the motor starts moving, relay 61 is energized and stepping relay 62 is de-energized. However, because of the aforementioned property of the stepping relay it will not transfer and contact 1 of stepping relay 62 will remain closed. This condition of the relays will prevail through the wire positions shown in FIGS. 3C and D and until the wire position of FIG. 3E is reached.

At the wire position of FIG. 3E, the motor 19 is stopped and relay 61 is de-energized. Stepping relay 62 is energized and transfers to close its contact 2, simultaneously de-energizing relay 49 and removing the injected signal $E_1$. Relay 63 is energized through contact 2 of stepping relay 62 and is locked through its own contact 4. It will not release until switch 51 between the coil of relay 63 and ground is opened.

The motor 19 then resumes driving the wire 11, but under the influence of the error signal $E_{er}$ alone, as is indicated by FIG. 3F. Relay 61 is again energized and stepping relay 62 is de-energized, but again it does not transfer.

When the skip-winding 14 is properly centered about the optical axis 37, a null condition of the error signal $E_{er}$ occurs and relay 61 is de-energized. Stepping relay 62 is energized and transfers to close its contact 1. Relay 63 is still locked in its energized state. A further relay 64 is energized through contact 2 of relay 63 and contact 1 of stepping relay 62. Energization of the relay 64 activates the cutter solenoid 27. As the cut is made the shaft of cutter 24 opens switch 51 thereby de-energizing relays 63 and 64. Relay 49 is energized through the now closed contact 1 of relay 63 and a full cycle back to the condition of FIG. 3B has occurred.

It is to be understood that the above described embodiment of the invention is merely illustrative and that numerous modifications may be made within the spirit and scope of the invention.

What is claimed is:

1. Apparatus for positioning an article in a predetermined position relative to an axis, said article having a measurable characteristic varying periodically along a dimension transverse to the axis, comprising:
   means for producing a signal proportional to a comparison of said characteristic for portions of said article on opposite sides of said axis;
   means for superimposing a predetermined signal on said first-mentioned signal;
   means for translating said article toward said predetermined position in response to said signals; and
   means responsive to the sum of said two signals and connected to said superimposing means for removing said predetermined signal before said article reaches said predetermined position, whereby said translating means positions the article in said predetermined position in response to the first-mentioned signal only.

2. Apparatus for positioning an article in a predetermined longitudinal position relative to a reference axis transverse to its length, said article having a measurable characteristic varying periodically as a function of its length, comprising:
   means for monitoring said characteristic to produce a primary signal proportional to a comparison of said characteristic for equal longitudinal portions of said article on opposite sides of said reference axis;
   means for superimposing a predetermined secondary signal on said primary signal;
   means for advancing said article toward said predetermined position in response to said signals; and
   means connected to said superimposing means for removing the secondary signal when the sum of said primary signal and said secondary signal is less than said primary signal.

3. Apparatus according to claim 2, wherein said removing means is operated when the sum of said primary signal and said secondary signal is substantially zero.

4. Apparatus for sequentially positioning the ends of elements of a chain-like series at a predetermined position comprising:
   electro-optical comparison means for producing an error signal;
   means for projecting light from an optical field which includes those portions of said elements which are on opposite sides of an axis passing through said predetermined position toward said comparison means;
   driving means for advancing said elements across said axis in response to the output of said comparison means;
   means for injecting a second signal in the output of the comparison means when an end of one element is at said predetermined position; and
   means for removing said second signal when the corresponding end of the next succeeding element lies within the optical field of said projecting means.

5. Apparatus for sequentially positioning the ends of elements of a repetitive series at a predetermined position, the ends of each of said elements having a substantially different light reflection characteristic than the remaining portion of said elements, comprising:
   means for driving said elements across an axis through said predetermined position;
   a pair of light sensitive signal producing means;
   light projecting means for directing an image of a discrete area on one side of said axis upon one of said signal producing means and an image of a corresponding discrete area on the opposite side of said axis upon the other of said signal producing means;
   means for deriving an error signal proportional to a comparison of the outputs of said signal producing means;
   a source of a predetermined signal;
   first means for applying both said error signal and said predetermined signal to said driving means;
   alternative means for applying said error signal alone to said driving means; and
   sequential control means for activating said first applying means when an end of a first element is at said predetermined position and for activating said alternative applying means when the corresponding end of the next succeeding element is within one of said discrete areas.

6. Apparatus according to claim 5 wherein said first applying means includes phase reversing means.

7. Apparatus according to claim 6 wherein said sequential control means includes:
   means for activating said first applying means when said end of said first element is at said first predetermined position;
   detecting means for determining the speed of said driving means;
   subcontrol means responsive to said detecting means operative when the speed of said driving means falls below a predetermined value; and
   switching means responsive to the first operation of said subcontrol means, to de-activate said first applying means and to activate said second applying means, and responsive to the next operation of said subcontrol means to operate said means for activating the first applying means.

8. Apparatus according to claim 7 wherein said means for activating said first applying means includes an element cutter and a switch actuated by the operation of an element cutter.

9. Apparatus according to claim 7 wherein said detecting means is a tachometer generator and said predetermined value is substantially zero.

10. Apparatus for severing individual wound wire filaments from an indefinite length of serially interconnected filaments, each of said filaments comprising an intermediate portion of relatively closely wound helical turns of wire, the intermediate portion being connected at opposite ends to adjacent filaments of the series by a skip-winding of a relatively large pitch so that the light reflection characteristics of the series of interconnected filaments vary substantially periodically along the length, which apparatus comprises:
   wire-severing means;
   wire-advancing means for moving the series of interconnected filaments lengthwise along a path across a predetermined axis and toward the wire-severing means, said wire-advancing means including an electrical drive motor having a variable speed responsive to an input signal;
   a pair of light-sensitive signal-producing means;
   light-projecting means for directing an image of a discrete area on one side of said axis upon one of said signal-producing means and an image of a corresponding discrete area on the opposite side of said axis upon the other of said signal means, the path of the length of interconnected filaments intersecting both of said discrete areas;
   means for comparing the outputs of said signal-producing means to produce a primary output signal proportional to the differences in the light reflecting characteristics of the different portions of the length of interconnected filaments lying within the respective discrete areas;
   first control means for applying to the drive motor an input signal proportional to the primary output signal;
   a source of a predetermined secondary output signal;
   second control means for applying to the drive motor an input signal proportional to the sum of the primary and secondary output signals, the secondary output signal being such as to cause the drive motor to continue the advance of the length of interconnected filaments toward the wire-severing means when the primary output signal is zero;
   switching means operable for sequentially connecting said first and second control means, respectively, to the drive motor;
   means actuated, while the first control means is connected to the drive motor, for operating the wire-severing means when a skip-winding connecting two adjacent filaments is centered with respect to said predetermined axis so that the output of said comparing means is zero, the wire-severing means removing a leading filament from the length of interconnected filaments;
   means actuated after the wire-severing means has operated for causing the switching means to disconnect the first control means and connect the second control means to the drive motor to advance the length of interconnected filaments; and
   means for operating the switching means to disconnect the second control means and reconnect the first control means to the drive motor as the next successive skip-winding advances into one of said discrete areas so that the wire-advancing means is again controlled independently by the comparing means and is stopped with the last-mentioned skip-winding centered with respect to said predetermined axis.

11. In apparatus for positioning an article in a predetermined position relative to a reference axis, the article being of a type having a measurable characteristic varying periodically along a dimension substantially transverse to the reference axis, which apparatus includes means for simultaneously sensing the characteristic for two portions of said article on opposite sides of said reference axis and for producing an error signal proportional to a comparison between the measured characteristic associated with each of said portions, and means for advancing the article relative to the measuring means, said advancing means being normally responsive to the error signal to advance the article until the error signal diminishes to a null, the error signal diminishing to a null twice during the relative movement of the article a distance equal to a single period of the periodically varying characteristic, the improvement which comprises:
   means for superimposing a predetermined secondary signal upon the error signal during a part of said period, the secondary signal and the part of the period being selected as to cause the secondary signal to suppress one of the null conditions and to cause the advancing means to continue the relative movement of the article until the next subsequent null condition occurs.

12. Apparatus according to claim 11 wherein the periodically varying characteristic is the light reflectivity of the article and the sensing and comparing means is electro-optical means.

13. Apparatus according to claim 12 wherein the secondary signal is superimposed at the beginning of a period and is such that sometime before the end of the period the sum of the secondary signal and the error signal diminishes to zero so that advancing means stops the article before the end of the period, and including means for sensing the interruption in the advance of the article and for removing the superimposed secondary signal so that the article is again advanced until the error signal again diminishes to a null condition.

References Cited by the Examiner

UNITED STATES PATENTS

| | | | |
|---|---|---|---|
| 2,369,223 | 2/45 | Ferger | 83—365 |
| 2,732,896 | 1/56 | Lundahl | 83—371 |
| 2,877,884 | 3/59 | Esenwein | 250—209 X |
| 3,096,443 | 7/63 | Laycak | 250—219.1 |

ANDREW R. JUHASZ, *Primary Examiner.*

HUNTER C. BOURNE, Jr., *Examiner.*